Patented Mar. 19, 1940

2,194,291

UNITED STATES PATENT OFFICE 2,194,291

STENCIL COATING COMPOUND AND PROCESS OF MAKING THE SAME

J Paul Bishop, Clarendon Hills, Ill., assignor to Corn Products Refining Company, New York, N. Y., a corporation of New Jersey No Drawing. Application November 30, 1938, Serial No. 243,154

16 Claims. (Cl. 41—38.6)

This invention relates to stencil sheets having coatings capable of being cut by a stylus or the key of a typewriter; and the primary object of the invention is to provide a coating compound suitable for this purpose which will make possible stencil sheets having improved characteristics.

Stencil coatings have been made heretofore of gelatin, casein and cellulose acetate compounds. The coating compound of the present invention has for its primary ingredient zein, the alcohol soluble protein of corn (maize) gluten, or other prolamine such as gliadin, the alcohol soluble protein of wheat. The compound provides a stencil coating which has greater strength, is less affected by temperature and humidity changes and is more water resistant than the compounds heretofore used for this purpose. Stencil coatings are likely to be softened in hot weather and made brittle in cold weather. Humidity tends to give them a tough and rubbery consistency. The compound of the present invention is less subject to these influences. It is also water resistant. Water dropped on the stencil will not injure it.

The compound consists preferably of the following ingredients:

(1) Zein or other prolamine.

(2) A low boiling point zein solvent such as aqueous ethyl alcohol, not denatured, de-natured ethyl alcohol, methyl alcohol or isopropyl alcohol. Preferably ethyl alcohol is used with a water content between 5% and 50%, the higher alcohol concentrations being preferred. Commercial 95% alcohol may be used which will give the solution an alcohol concentration of about 92% since commercial zein will ordinarily contain about 8%, by weight, of moisture. The proportion of alcohol to zein may be varied to some extent. Too thin a solution, however, will give a coating which is too light. A solution containing too much zein will give a coating difficult to be cut with the stylus or typewriter key.

(3) A high boiling point solvent such as Cellosolve (ethylene glycol mono ethyl ether) which boils at about 136° C. The quantity of the higher boiling point solvent should be in the ratio of about 1 to 3½ with the alcohol. The purpose of the high boiling point solvent is to keep the zein in solution after the alcohol is evaporated and while the water is being dried out. Water tends to precipitate zein from its alcoholic solution. If this precipitation is allowed to occur, the film will be opaque instead of translucent. That is, the film will have a "blush." Also precipitation of zein tends to make the coating too brittle. Other high boiling point zein solvents could be used such as diacetone or ethylene glycol mono methyl ether.

(4) A plasticizing substance or substances. Any of the common plasticizers for zein or other proteins could be used. In order to obtain the best results the following substances are used in combination: 1—dibutyl tartrate or diethylene glycol dibenzoate, or other ester of a higher alcohol having six or more carbon atoms; 2—castor oil or any other non-drying vegetable oil. Experience has shown that the mineral oils tend to bleed out of the compound. 3—diglycol stearate or diglycol palmitate, or other fatty acid ester.

(5) Formaldehyde preferably in the form of a 40% solution (formalin). This is a preferred, but perhaps not necessary ingredient. Its primary function is to give the coating capacity for water resistance. The formaldehyde, which is a latent solvent of zein, reacts with the zein as a coagulent to form a practically insoluble compound, which, without the plasticizing agent, would be too brittle. The plasticizing agent counteracts this tendency to brittleness with the result that the coating is made water resistant but soft enough to be readily cut.

If the ingredients include diglycol stearate, the mixture should be warmed to about 130° F. to secure a smooth mixture and an even homogeneous film.

The following is a specific example of the compound with the preferred ingredients in their preferred proportions. This example is to be considered as informative and typical merely, and not as limiting the invention to the specified details; the intention being to cover all equivalents as well as all modifications within the scope of the appended claims.

Example: The ingredients are given in parts by weight:

| | |
|---|---|
| Zein | 10 parts (or within the range of 8.5 to 11.5 parts) |
| 95% ethyl alcohol | 35 parts (30–40 parts) |
| Cellosolve | 10 parts (ratio 1–3½ with alcohol) |
| Dibutyl tartrate | 15 parts (12–18 parts) |
| Castor oil | 3 parts (2.25–3.75 parts) |
| Diglycol stearate | 10 parts (7.5–12.5 parts) |

To this may be added 5 parts of formalin.

The coating solution thus formed is applied to the paper sheets preferably at temperatures between 100° F. and 140° F., after which the sheets are allowed to dry or are dried artificially.

This application is a continuation in part of application of J Paul Bishop, Serial No. 49,352, filed November 12, 1935, for "Stencil coating compound and process of making the same."

I claim:

1. A stencil sheet provided with a coating consisting of the product of an aqueous ethyl alcoholic solution of zein and a plasticizing agent comprising dibutyl tartrate, castor oil and diglycol stearate.

2. A stencil sheet provided with a coating consisting of the product of an aqueous ethyl alcohol solution of zein, formaldehyde, and a plasticizing agent comprising dibutyl tartrate, castor oil and diglycol stearate.

3. A stencil sheet provided with a coating consisting of the product of a solution in aqueous ethyl alcohol and Cellosolve of zein, formaldehyde, and a plasticizing agent containing dibutyl tartrate, castor oil and diglycol stearate.

4. A compound which in the form of a film may be cut with a stylus comprising the product of an aqueous ethyl alcohol solution of zein and a plasticizing agent consisting of dibutyl tratrate, castor oil and diglycol stearate.

5. A compound which in the form of a film may be cut with a stylus comprising the product of an aqueous ethyl alcohol solution of zein, formaldehyde, and a plasticizing agent consisting of dibutyl tartrate, castor oil and diglycol stearate.

6. A compound which in the form of a film may be cut with a stylus comprising the product of an aqueous ethyl alcohol solution of zein, formaldehyde, Cellosolve and a plasticizing agent consisting of dibutyl tartrate, castor oil and diglycol stearate.

7. The process of making a coating compound suitable for stencil sheets which comprises: dissolving zein in an aqueous solution of ethyl alcohol containing formaldehyde and adding a plasticizing agent consisting of dibutyl tartrate, castor oil and diglycol stearate.

8. The process of making a coating compound suitable for stencil sheets which comprises: dissolving zein in an aqueous solution of ethyl alcohol containing Cellosolve and formaldehyde and adding a plasticizing agent consisting of dibutyl tartrate, castor oil and diglycol stearate.

9. The process of plasticizing zein which comprises dissolving 10 parts by weight of zein in 35 parts of 95% ethyl alcohol, 10 parts of Cellosolve and 5 parts of formalin; then adding to the solution 15 parts of dibutyl tartrate, 3 parts of castor oil and 10 parth of diglycol stearate.

10. A compound for coating stencil sheets composed of: zein; a solvent of zein; a plasticizing substance comprising a substance of the group consisting of dibutyl tartrate and diethylene glycol dibenzoate; a non-drying vegetable oil; and a substance of the group consisting of diglycol stearate and diglycol palmitate.

11. A compound for coating stencil sheets composed of: zein; a solvent of zein; a plasticizing substance comprising a substance of the group consisting of dibutyl tartrate and diethylene glycol dibenzoate; a non-drying vegetable oil; a substance of the group consisting of diglycol stearate and diglycol palmitate; and formaldehyde.

12. A compound for coating stencil sheets composed of: zein; a solvent of zein; plasticizing substances comprising dibutyl tartrate, castor oil and diglycol stearate; and formaldehyde.

13. A compound for coating stencil sheets composed of: zein; a low boiling point alcoholic solvent of zein; a high boiling point solvent of zein; plasticizing substances comprising a substance of the group consisting of dibutyl tartrate and diethylene glycol dibenzoate; a non-drying vegetable oil; and a substance of the group consisting of diglycol stearate and diglycol palmitate; and formaldehyde.

14. A compound for coating stencil sheets composed of: zein; aqueous ethyl alcohol; Cellosolve; plasticizing substances comprising a substance of the group consisting of dibutyl tartrate and diethylene glycol dibenzoate; a non-drying vegetable oil; a substance of the group consisting of diglycol stearate and diglycol palmitate; and formaldehyde.

15. A compound for coating stencil sheets composed of the following substances in the proportions, by weight, substantially as follows: zein, 8.5 to 11.5 parts; 95% ethyl alcohol, 30 to 40 parts; Cellosolve in the ratio with alcohol of 1 to 3½ parts; dibutyl tartrate, 12 to 18 parts; castor oil, 2.25 to 3.75 parts; and diglycol stearate 7.5 to 12.5 parts.

16. A compound for coating stencil sheets composed of the following substances in the proportions, by weight, substantially as follows: zein, 10 parts; 95% ethyl alcohol, 35 parts; Cellosolve, 10 parts; dibutyl tartrate, 15 parts; castor oil, 3 parts; and diglycol stearate, 10 parts.

J PAUL BISHOP.